United States Patent [19]

Bryngelson

[11] Patent Number: 5,024,479
[45] Date of Patent: Jun. 18, 1991

[54] AUTOMOTIVE SUN SCREEN

[76] Inventor: Gaylord D. Bryngelson, 811 E. School, Owatonna, Minn. 55060

[21] Appl. No.: 437,112
[22] Filed: Nov. 16, 1989
[51] Int. Cl.[5] .............................................. B60J 3/00
[52] U.S. Cl. .................................. 296/97.7; 296/97.8; 160/262; 160/290.1; 16/124
[58] Field of Search ................... 296/97.1, 97.2, 97.4, 296/97.7, 97.8, 97.9, 97.11; 160/DIG. 3, 370.2, 262, 265, 290.1; 16/124

[56] References Cited

U.S. PATENT DOCUMENTS

| | | | |
|---|---|---|---|
| 1,071,158 | 8/1913 | Hurlbut | 160/262 X |
| 1,621,972 | 3/1927 | Darby | 296/97.8 X |
| 1,913,961 | 6/1933 | Shape | 296/97.7 |
| 2,927,819 | 3/1960 | Johnson | 160/370.2 X |
| 2,927,819 | 3/1960 | Johnson | 296/97.8 |
| 3,183,033 | 5/1965 | Stulbach | 296/97.7 X |
| 3,584,910 | 6/1971 | Lupul | 296/97.8 X |
| 4,335,773 | 6/1982 | Masi | 160/370.2 X |
| 4,707,018 | 11/1987 | Gavagan | 296/97.8 X |
| 4,736,980 | 4/1988 | Eubanks | 296/97.8 X |
| 4,758,041 | 7/1988 | Labeur | 296/97.8 X |
| 4,762,358 | 8/1988 | Levosky et al. | 296/97.7 |
| 4,823,859 | 4/1989 | Park | 296/97.9 X |

FOREIGN PATENT DOCUMENTS

| | | | |
|---|---|---|---|
| 531135 | 8/1931 | Fed. Rep. of Germany | 296/97.7 |
| 1405949 | 6/1965 | France | 296/97.8 |
| 244277 | 12/1925 | United Kingdom | 296/97.7 |

Primary Examiner—Margaret A. Focarino
Assistant Examiner—Andrew C. Pike

[57] ABSTRACT

A retractable sun screen, for a vehicle windshield, includes a flexible sheet normally rolled up into a helical configuration on a roller located within a tubular housing. The flexible sheet can be unwound from the roller to extend along the windshield, thereby shielding the vehicle interior surfaces from solar rays (and keeping the inside of vehicle cooler). While the vehicle is being driven the flexible sheet is retracted into the tubular housing.

2 Claims, 1 Drawing Sheet

U.S. Patent
June 18, 1991
5,024,479
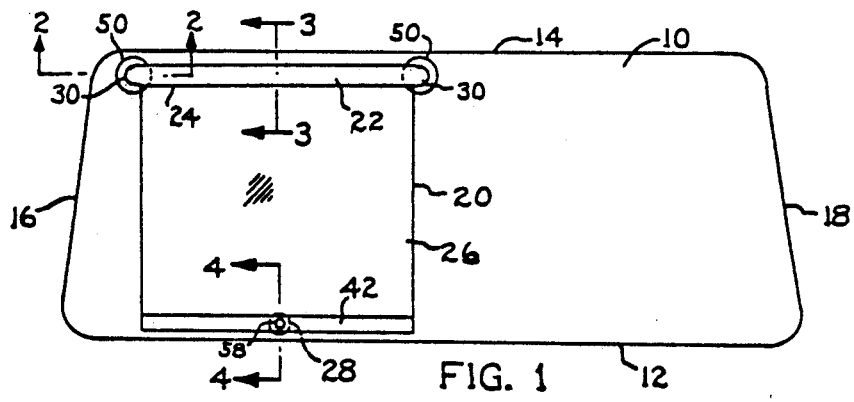
FIG. 1
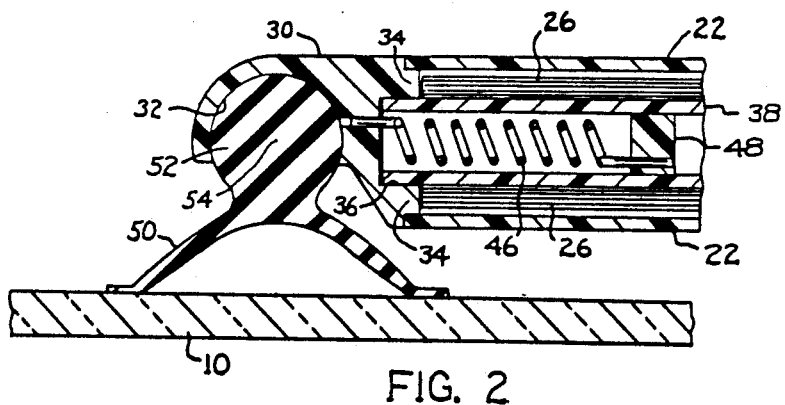
FIG. 2
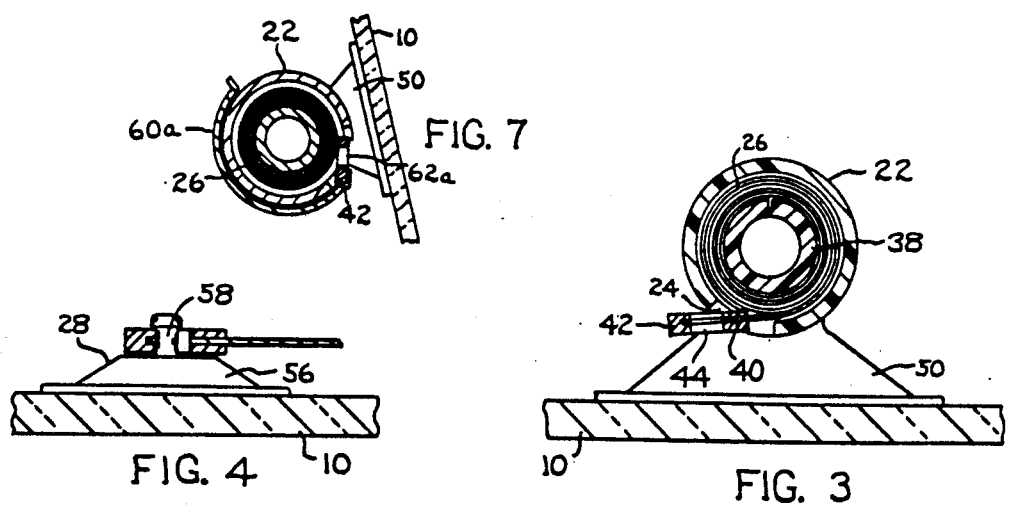
FIG. 7
FIG. 4
FIG. 3
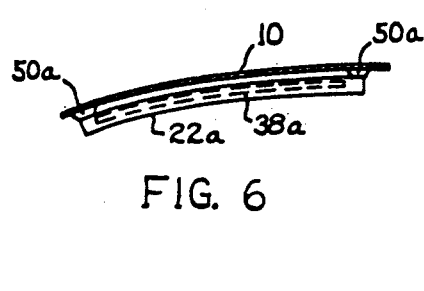
FIG. 6
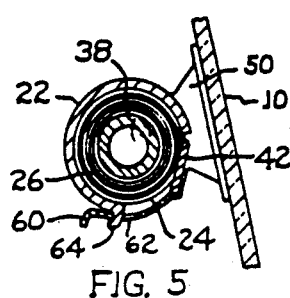
FIG. 5

AUTOMOTIVE SUN SCREEN

BACKGROUND AND SUMMARY OF THE INVENTION

This invention relates to a retractable sun screen usable on automotive vehicle windshields to minimize the heating effects of solar rays on interior surfaces within the vehicle, e.g. the steering wheel, dashboard, and front seat. The sun screen includes a flexible opaque sheet that is normally rolled up into a tubular casing located within the vehicle preferably near the upper edge of the windshield. Before the driver leaves the vehicle, he/she pulls the flexible sheet down along the windshield surface to a position obstructing the passage of solar rays into the vehicle. When the person returns to the vehicle, the vehicle interior surfaces will be relatively cool and hence comfortable to the touch.

There are already in existence other retractable sun screens having some similarities to my proposed sun screen. In this connection, I am aware of the following: U.S. Pat No. 2,927,819 to J. Johnson; U.S. Pat. No. 4,707,018 to J. Favagan; U.S. Pat. No. 4,736,980 to M. Eubanks, and U.S. Pat. No. 4,758,041 to L. Labeur.

My invention relates to a retractable "roll-up" sun screen that can be installed in a variety of different automotive vehicles without need to drill mounting holes in the vehicle surfaces or otherwise deface the vehicle interior structure. The proposed sun screen includes suction cup devices designed to grippingly engage the vehicle windshield interior surface in order to operatively mount the sun screen. The suction cup devices can have adjustable swivel connections to the sun screen structure, such that the suction cups seat properly against curved (or oblique) windshield surfaces.

Variations in windshield curvature can be accommodated, i.e. the sun screen can be operatively mounted in many different vehicles having a variety of different windshield curvatures.

THE DRAWINGS

FIG. 1 is an interior elevational view of a vehicle windshield having a sun screen of the present invention installed thereon.

FIG. 2 is an enlarged fragmentary sectional view on line 2—2 in FIG. 1.

FIG. 3 is an enlarged fragmentary sectional view on line 3—3 in FIG. 1, but with the sun-block sheet in a retracted position.

FIG. 4 is an enlarged fragmentary sectional view on line 4—4 in FIG. 1, but with the sun-block sheet shown in phantom to better illustrate an anchorage mechanism 28.

FIG. 5 is a top plan view of a curved roller unit that can be used in practice of the invention.

FIG. 6 is a view similar to FIG. 3, but illustrating a different hook structure for anchoring the sun screen in its extended position.

FIG. 7 illustrates a variant of the FIG. 5 structure.

DESCRIPTION OF A PREFERRED EMBODIMENT OF THE INVENTION

FIG. 1 is a view taken from within a conventional automotive vehicle, and looking forward toward the vehicle front windshield 10. The windshield has a lower edge 12, a upper edge 14, a left side edge 16, and a right side edge 18. An improved sun screen 20 is mounted on the windshield to provide solar protection for the driver's side of the vehicle, i.e. the left half of the windshield.

The improved sun screen comprises an elongated cylindrical tubular housing 22 having a longitudinal slot 24 oriented to permit a flexible sheet 26 to be pulled downwardly from the tube interior so as to hook onto an anchorage mechanism 28 located near lower edge 12 of the windshield. When the vehicle is being driven the flexible sheet 26 is coiled around a spring-biased roller 38 within tube 22, as shown in FIG. 3.

Opposite ends of tube 22 are closed by means of two similarly-constructed cap structures 30. As shown in FIG. 2, a representative cap structure comprises a plastic body having a spherical cavity 32 near its outer end. The plastic body further includes a cylindrical plug section 34 having a close fit within the end of tube 22. An internal cylindrical socket (recess) 36 extends from the right end face of the plastic body to form a bearing surface for a cylindrical roller 38. The aforementioned flexible sheet 26 is coiled around roller 38, with one end of the sheet being affixed to the roller outer surface. As seen best in FIG. 3, the free edge 40 of flexible sheet 26 extends outwardly through slot 24 to a fixed connection with a stiffener strip 42. A circular hole 44 is extended through strip 42 to form a hook structure cooperable with anchorage mechanism 28 (FIG. 4) for holding sheet 26 in its extended position (FIG. 1).

Stiffener strip 42 is preferably rigid in the plane of its greatest transverse cross section, so that the strip will be enabled to hold sheet 26 in a reasonably taut condition extending generally parallel to the adjacent windshield surface. However, strip 42 will preferably have some flexibility in its thickness plane, such that strip 42 could bend if necessary to conform to curved windshield surfaces.

Slot 24 is preferably located in the surface of tube 22 that faces the windshield surface. With such an arrangement the flexible sheet 26 will extend in close adjacency to the windshield surface when the sheet is in its operating position (FIG. 1). Also, the slot will be concealed from view, such that the tubular housing will have a smooth uninterrupted surface appearance when sheet 26 is retracted into the tube.

A torsion coil spring 46 is arranged within roller 38 for normally biasing the roller to a position wherein the flexible sheet 26 is fully rolled up into tube 22, as shown in FIG. 3. One end of spring 46 is anchored to a plug 48 that is affixed to roller 38. The other end of spring 46 is anchored to cap structure 30. A spring-biasing force may be built into the mechanism by assembling roller 38 and coiled sheet 26 into tube 22 prior to final connection of the tube to cap structure 30. An adhesive may be applied to the joint between tube 22 and cap structure 30 after the cap structure has been rotated to develop the spring-biasing force.

FIG. 2 shows a cap structure 30 at one end of tube 22. A similar cap structure will be employed at the other end of tube 22 (with or without a second torsion spring). Tube 22 and the associated roller 38 are mounted on the vehicle windshield, using two similarly constructed suction cups 50. Each suction cup has an integrally formed spherical enlargement 52 located within spherical cavity 32 in the associated cap structure 30. The suction cup and spherical enlargement are integrally formed as a one piece elastomeric (or plastic) molded member. Resilience of the elastomer is such that the spherical enlargement can be forced into the spherical cavity as a snap fit. The suction cup has swivel adjustment capability around the cavity center point 54.

To enhance the holding action of the suction cups, each cup could have a film of non-permanent bonding material on the portion of its suction surface engaged with the windshield. The bonding material would provide a mechanical adhesive bond, while also enhancing the seal between the suction cup and windshield.

Anchorage mechanism 28 (FIG. 4) comprises a third suction 56 that has a pin-type protuberance 58 sized to fit through hole 44 in stiffener strip 42. In use of the sun screen mechanism, a manual pulling force can be applied to stiffener strip 42 to draw sheet 26 downwardly out of tubular housing 22. The hole in strip 42 can be emplace over pin 58 to retain sheet 26 in a stretched (taut) position extending downwardly along the inner surface of windshield 10. When stiffener strip 42 is removed from pin 58 the torsion spring 46 will return sheet 26 back into tube 22 (as shown in FIG. 3).

Sheet 26 will be formed of a flexible material that has the ability to block solar rays. The sheet can be colored in a single color or in any desired print design.

In preferred practice of the invention, tubular housing 22 will be mounted on the windshield near the windshield upper edge. Anchorage mechanism 28 will be located near the windshield lower edge. Mechanism 28 will be located in or near the air flow path generated by the vehicle windshield defroster (not shown). However, the single suction cup 56 offers only minor resistance to the defroster hot air flow; therefore, the sun screen can be mounted on the windshield without adversely affecting defroster performance.

In vehicles where the defroster air flow is not generated near the lower edge of the windshield it would be feasible to locate tubular housing 22 near the windshield lower edge. In such a case the anchorage mechanism 28 would be located at the upper edge of the windshield; the flexible sheet 26 would then be pulled upwardly to operatively position the sheet in a sun-blocking position.

The swivel-type connections between suction cups 50 and tube 22 are advantageous in that the peripheral edge areas of the suction cups can sealably seat flatwise against the windshield surface even though the windshield may have a transverse curvature therealong. It is fairly common for vehicle windshields to have some built-in curvatures for reasons of styling and wraparound driver visibility. Swivel adjustments of suction cups 50 will compensate for windshield curvatures and obliqueness that could otherwise cause the suction cups to improperly mate to the windshield surfaces.

The center 54 of each swivel structure is preferably located on or near the centerline of tube 22 (as shown in FIG. 2), such that tube 22 is located fairly close to the windshield surface where it will not interfere with proper operation of the vehicle sun visor (not shown). Tube 22 will have a diameter on the order of one to 1 ½ inches.

FIG. 5 shows a variant of the mechanism used to hold sheet 26 in its extended position. In this case stiffener strip 42 is a thin solid bar element extending the full width of sheet 26. At its midpoint strip 42 is attached to a short handle structure 60 having a hole 62 therethrough. The handle structure can be hooked onto (over) a tab 64 that extends outwardly from tube (housing) 22 at a point midway along the tube length. A pulling force on handle 60 will draw sheet 26 out of housing 22 to a sun-blocking position. Hole 62 in the handle can be hooked over protuberance 58 (FIG. 4) to hold sheet 2 in its extended position.

FIG. 6 illustrates a curved tube structure that could possibly be used in practice of the invention in order to make the housing harmonize with interior automotive styling employing curved windshields. As shown in FIG. 6, tube 22a is curved to follow the windshield curvature. The associated roller 38a (on which the sun block sheet is rolled) could be formed of rubber or an elastomeric plastic to maintain parallelism between the roller surface and housing interior surface as the roller rotates on its end bearings.

When the housing follows the windshield curvature, as shown in FIG. 6, it should not be necessary to employ ball-socket joints between the housing and the associated suction cups 50a. The suction cups can be rigidly secured to the housing, e.g. by means of buttons extending from the cups into slots in the housing wall.

FIG. 7 shows a construction that is basically the same as the FIG. 5 construction. However, in the FIG. 7 arrangement hole 62a is formed in stiffener strip 42 rather than in the handle structure. Handle structure 60a is elongated and curved in the transverse direction so that it can extend around slightly more than one half of the circumference of tube 22 (when sheet 26 is in its rolled-up condition). Handle structure 60a is formed of a resilient strip material such that it can resiliently grip the tube 22 surface. The free end of handle structure 60a is easily accessible (i.e. easily reached), and yet the handle structure is relatively inconspicuous.

It will be understood that while specific structural arrangements are shown in order to disclose the invention, yet the invention can be practiced in various different forms, as comprehended by the attached claims.

I claim:

1. For use on an automotive vehicle windshield: a sun screen comprising an elongated hollow tube (22) having two ends and a longitudinal slot (24) extending between said tube ends; a suction cup attached to each end of the hollow tube for securement of the tube to an inner surface of the vehicle windshield; and elongated roller rotatably mounted within said tube; an opaque flexible sun-block sheet coiled around said roller for extension through the longitudinal slot, said sheet having a free edge (40); an anchor means (28) located on the windshield remote from said hollow tube; a stiffener strip (42) extending along the free edge of said flexible sheet; and a retainer means carried by said stiffener strip for engaging said anchor means to releasably retain the flexible sheet in an operating position extending along the windshield surface; said longitudinal slot (24) being located on the tube so that the slot faces the windshield, whereby the stiffener strip is at least partially concealed from persons seated within the vehicle when the flexible sheet is fully wound onto the roller within the hollow tube; said retainer means comprising a transversely curved handle structure extending partially around the hollow tube when the flexible sheet is fully wound onto the roller.

2. The sun screen of claim 1 wherein said transversely curved handle structure extends around one half of the tube when the flexible sheet is fully wound onto the roller; said handle structure being formed of a resilient material whereby the handle structure is enabled to resilient grip the tube.

* * * * *